(12) United States Patent
Pylkki et al.

(10) Patent No.: US 6,988,339 B2
(45) Date of Patent: Jan. 24, 2006

(54) SPECIALTY MEDIA WINDOW

(75) Inventors: Russell J. Pylkki, St. Paul, MN (US); James B. Libby, Stillwater, MN (US); Kurt E. Heikkila, Marine on St. Croix, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 10/348,039

(22) Filed: Jan. 20, 2003

(65) Prior Publication Data

US 2003/0233794 A1 Dec. 25, 2003

Related U.S. Application Data

(63) Continuation-in-part of application No. 10/068,070, filed on Feb. 6, 2002.

(51) Int. Cl.
*E04D 13/18* (2006.01)

(52) U.S. Cl. .................. 52/173.3; 52/204.5; 52/204.59; 52/208; 81/388; 353/70; 353/79; 353/119; 359/444; 359/445; 362/86; 362/87; 381/152; 381/333; 381/425; 381/345

(58) Field of Classification Search ................ 52/204.1, 52/204.71, 171.3, 706.1, 800.12; 349/16, 349/96, 98; 359/228
See application file for complete search history.

(56) References Cited

U.S. PATENT DOCUMENTS

| 1,778,084 A | 10/1930 | Nevin |
| 3,943,282 A | 3/1976 | Muntz |
| 4,058,837 A | 11/1977 | Muntz |
| 4,231,067 A | 10/1980 | Jewell et al. |

(Continued)

FOREIGN PATENT DOCUMENTS

| DE | 201 13 157 U1 | 1/2002 |
| FR | 2 434 540 | 4/1980 |
| GB | 2 351 200 A | 12/2000 |
| JP | 11072843 A | 3/1999 |
| WO | WO 97/09842 | 3/1997 |
| WO | WO 99/37121 | 7/1999 |
| WO | WO 00/35242 | 6/2000 |
| WO | WO 00/60407 | 10/2000 |
| WO | WO 01/03467 A2 | 1/2001 |
| WO | WO 01/05189 A2 | 1/2001 |
| WO | WO 01/10168 A2 | 2/2001 |

OTHER PUBLICATIONS

"NXT, Technology Review, Jan. 2002," http://www.nxt-sound.com/nxtsound/technology/techrev/index.asp, 33 pp. (date printed: Feb. 7, 2003).
"Billboard Vision", 3 pages (Date Unknown).
"Glas Platz All–Glass Loudspeakers. Elegant All–Glass Loudspeakers from Glass Platz are the Ultimate Showcase of NXT's SURFACESOUND™ Technology", http://www.dba–pr.com/client/nxt_plc/releases/glassplatz.htm, 2 pages (Date Printed Jan. 24, 2002).

(Continued)

*Primary Examiner*—Carl D. Friedman
*Assistant Examiner*—Yvonne M. Horton
(74) *Attorney, Agent, or Firm*—Womble Carlyle Sandridge & Rice, PLLC

(57) ABSTRACT

A media window system includes a window unit having a window frame defining a frame perimeter and a glass unit located within the frame perimeter. The window unit includes a display area adapted to receive a display image. A display image source is configured to project an image onto the display surface. The window unit also includes a speaker element disposed on the window. The display are of the window unit is capable of transforming from a first transparent state to a second increased opacity state for receiving the display image.

54 Claims, 12 Drawing Sheets

U.S. PATENT DOCUMENTS

| | | | |
|---|---|---|---|
| 4,281,488 | A | 8/1981 | Resibois |
| 4,400,723 | A | 8/1983 | Fanizza et al. |
| 5,007,707 | A | 4/1991 | Bertagni |
| 5,793,877 | A | 8/1998 | Tagg |
| 6,332,029 | B1 | 12/2001 | Azima et al. |
| 6,369,943 | B1 | 4/2002 | Bachmann et al. |
| 6,389,935 | B1 | 5/2002 | Azima et al. |
| 6,394,609 | B1 | 5/2002 | Rodriguez, Jr. et al. |
| 6,394,610 | B2 | 5/2002 | Rodriguez, Jr. |
| 6,397,972 | B1 | 6/2002 | Bank et al. |
| 6,399,870 | B1 | 6/2002 | Azima et al. |
| 6,443,586 | B1 | 9/2002 | Azima et al. |
| 6,456,723 | B1 | 9/2002 | Bank et al. |
| 6,572,232 | B2 | 6/2003 | Yaniv |
| 6,577,355 | B1 | 6/2003 | Yaniv |
| 6,588,909 | B2 | 7/2003 | Yaniv et al. |
| 6,616,284 | B2 | 9/2003 | Yaniv et al. |
| 2002/0114483 | A1 | 8/2002 | Azima et al. |
| 2003/0174295 | A1 | 9/2003 | Yaniv et al. |

OTHER PUBLICATIONS

"Glas Platz, Wiehl–Bomig –Expo 2000", http://www.glas-platz.de/_refsmhouse.htm, 2 pages (Date Printed Jan. 24, 2002).

"Smart–house.net 'future living for today'. Heart of Glass", http://www.smart–house.net/monthly_features/sept01–2.shtml, 3 pages(Sep. 2001).

"Switchable Privacy Glass. AGP 'UMU' Privacy at the Flick of a Swithch", Architectural Glass Projects Pty Limited, 6 pages (Date Printed).

SPECIALTY MEDIA WINDOW

RELATED PATENT APPLICATION

This application is a continuation in part of U.S. application Ser. No. 10/068,070, titled Specialty Display Window, filed Feb. 6, 2002, which is hereby incorporated by reference herein.

BACKGROUND OF THE INVENTION

Windows and doors provide an outside view of our surroundings and are often a prominent feature of living areas in homes. Entertainment systems with televisions and sound systems are another prominent feature of living areas. Often, the furniture arrangement of a living area is focused on the entertainment system and does not take advantage of outside views. Entertainment systems also take up significant space in a living area. Living area concepts that accommodate both the frequent use of entertainment centers and a natural outside view are needed.

SUMMARY OF THE INVENTION

A media window system is described having a window unit including window frame defining a frame perimeter and a glass unit located within the frame perimeter. The glass unit has a display area that can transform from a first transparent state to a second increased opacity state to receive a display image. The media window system also has a display image source that directs a display image onto the display area and a speaker element in the window unit.

The display image source may be a projector. The transformation of the display area to a more opaque state may be accomplished by a suspended liquid crystal device or by a movable screen between two panes of glass. Many different locations for the projector are possible, such as attached to a ceiling or within an object sitting on the floor.

A method is also described where a window unit is provided and the glass unit of the window unit includes has a display area that can transform from a first transparent state to a second increased opacity state for receiving a display image. Then a display image source is positioned to project an image onto the display area and a speaker is positioned on the window unit.

Another embodiment of a media window system for use in an interior wall also includes a window unit having a display area that can transform from a first transparent state to a second increased opacity state. The system also has a display image source to direct a display image onto the display area and a speaker in the interior wall near the window unit.

In another embodiment, a window unit includes a window frame defining a frame perimeter, a glass unit located within the frame perimeter, a first grill element positioned on the glass unit, and an acoustical exciter attached to the glass unit and positioned at least partially behind the first grill element. The glass unit is configured to project sound waves by vibrating in response to signals from the exciter. The exciter may be positioned between two panes of glass in the glass unit.

In yet another embodiment, a window unit has an exciter positioned between first and second panes of glass, where the glass is configured to project sound waves by vibrating in response to signals from the exciter.

DETAILED DESCRIPTION

The present invention is applicable to many different types of windows or doors that include a glazing unit such as glass. Generally, a window unit including a glazing may be configured to switch from a transparent state to an opaque state. In the opaque state, a display image may be projected onto the glazing unit. Speakers included in the window unit or positioned on the glazing provide sound accompanying the images. As a result, a household window can be transformed into an entertainment center, reducing the amount of furniture and electronic components in a living area and allowing the furniture of the living area to be directed toward the window, to enjoy the outside view when desired or to watch TV or movies when desired.

Figure 1:
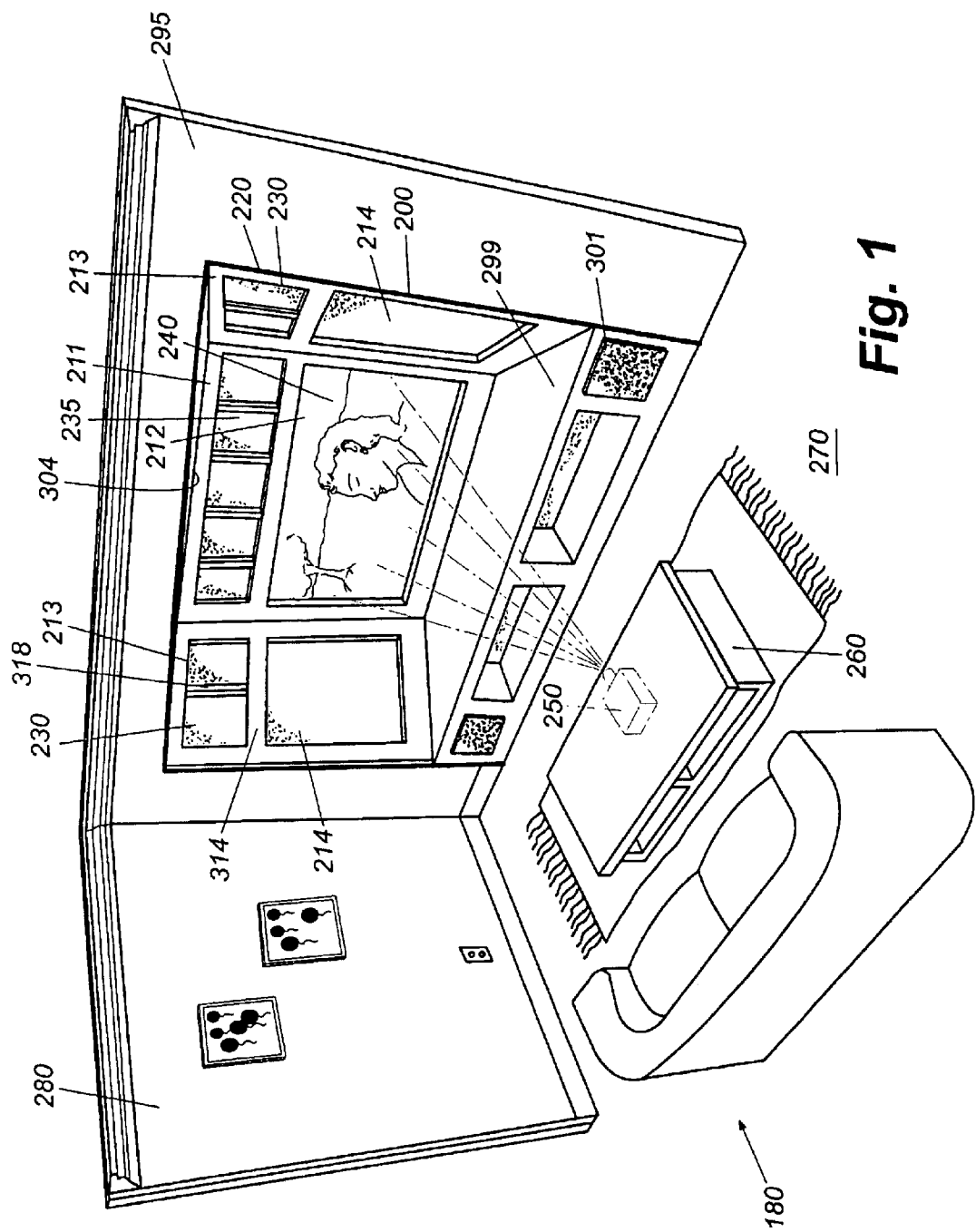
FIG. 1 is a perspective view of a media window system in accordance with the invention.

FIG. 1 is a perspective view of a media window system 180 with a bay window unit 200 in accordance with one embodiment of the invention. The bay window unit 200 has a bay window perimeter 220 that attaches to a wall 295 of a structure. A main window 235 and two side windows 230 are included in the bay window unit and are joined together using conventional mulling techniques. The bay window unit 200 also includes a seat board 299 and a headboard 304 providing horizontal planes framing the glazing units.

Below the seat board 299, a cabinet area 301 may be provided, which may store electronic components associated with the media window system 180. The main window 235 has a frame 211 and a glass unit 212 and each of the side windows 230 have a frame 213 and a glass unit 214. The window unit 200 may be capable of being opened or closed. The window 200 may alternatively be, for example, a picture window, bow window, projection window, a double-hung window, a skylight, egress window, an awning window, a casement window, a gliding window, and the like.

The window 235 includes a display area 240 adapted to receive a display image. The display area 240 of the main window 235 can transform from a first transparent state to a second increased opacity state for receiving the display image on the display surface 240. Any means of increasing the opacity of transparent materials may be used such as, for example, polymer dispersed liquid crystal technology or a movable screen between two panes of glass. A transparent state means that a significant percentage of visible light can pass through an object. Preferably, a large percentage of visible light can pass through an object in a transparent state. An increased opacity state means that less light passes through the display area than in the transparent state, and enough light is scattered so that an image projected on the display surface can be viewed.

Polymer dispersed liquid crystals may be sandwiched between two pieces of conducting glass. The conducting glass may be a portion of, or the entire windows 230, 235. Polymer dispersed liquid crystals operate on the principle of electrically controlled light scattering. When electric current is not applied to the conducting glass, the liquid crystal droplets are randomly orientated, creating an increased opacity state. When electricity is applied, the liquid crystal droplets align parallel to the electric field and light passes through, creating a more transparent state. A polymer dispersed liquid crystal device panel is available under the tradename Privalite from Saint-Gobain. Polymer-stabilized liquid crystal devices may also be used with the present invention, where an electric field is applied to the conducting glass to switch between a transparent and opaque state, but the field is not needed to maintain either state.

The main display window 235 and the two side windows 230 may be operated independent of each other. The opacity of the main display window 235 can be increased while leaving one or both side windows 230 transparent. Alternatively, the opacity of one or both side windows 230 can be increased while leaving the main display window 235 transparent.

The media window system may include a display image source 250. Image source 250 may be disposed in many different locations as discussed further herein. In the embodiment of FIG. 1, the image source 250 is located in an object 260. Object 260 is shown on the surface of floor 270 near window unit 200, spaced from the window unit 200. Object 260 can be a table, footrest, or any other object suitable for containing an image source 250. However, the display image source may also be located outside of object 260 while remaining within the scope of the invention. The display image source 250 can be located directly on floor 270, on top of object 260, on wall 280 or on a ceiling. Alternatively, more than one display image source 250 can be located near the window unit 200. Some of the alternatives are discussed further herein. The display image source 250 may be, for example, a projector.

Figure 2:
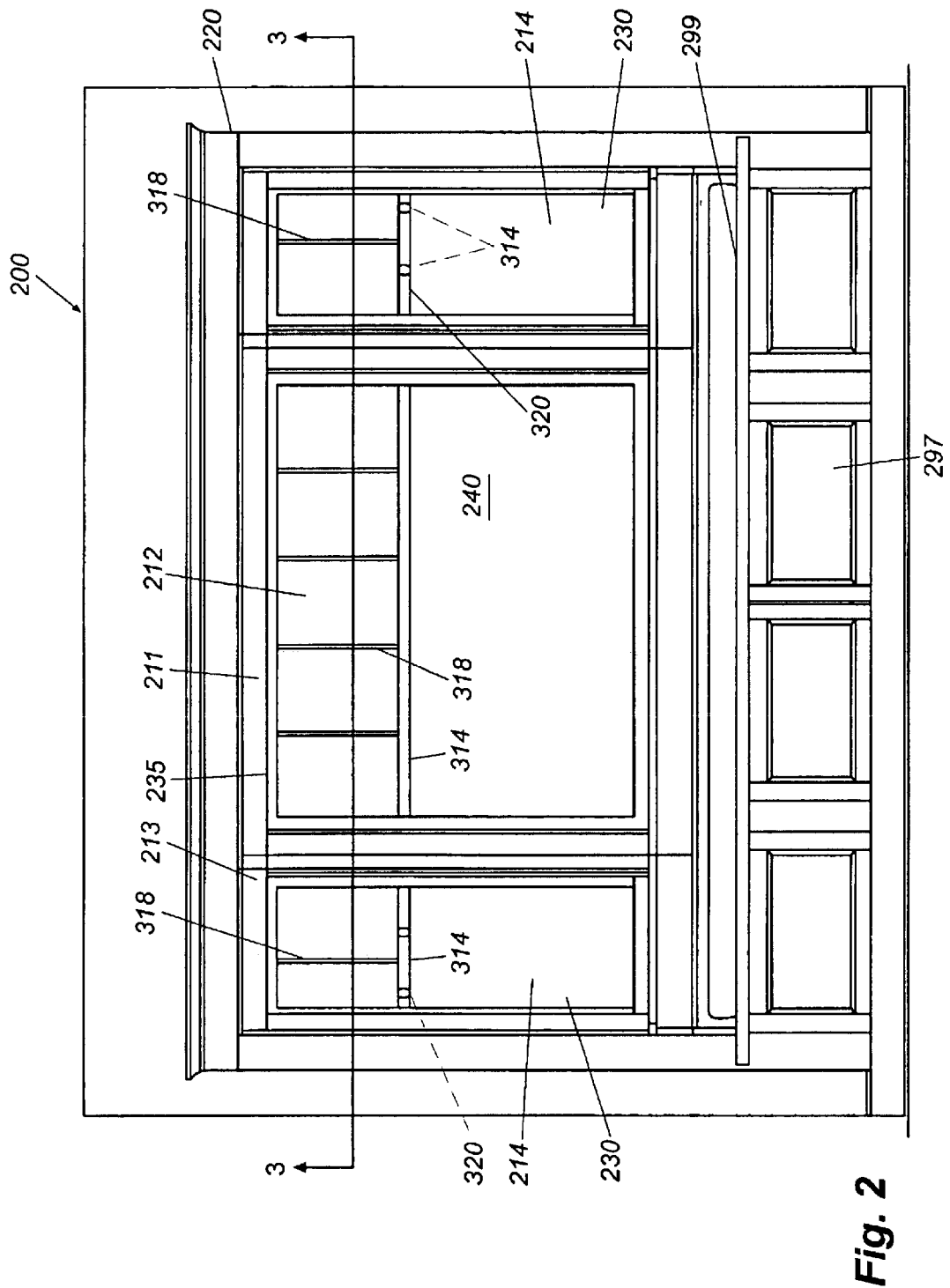
FIG. 2 is a front view of a bay window unit similar to that shown in FIG. 1.
Figure 3:
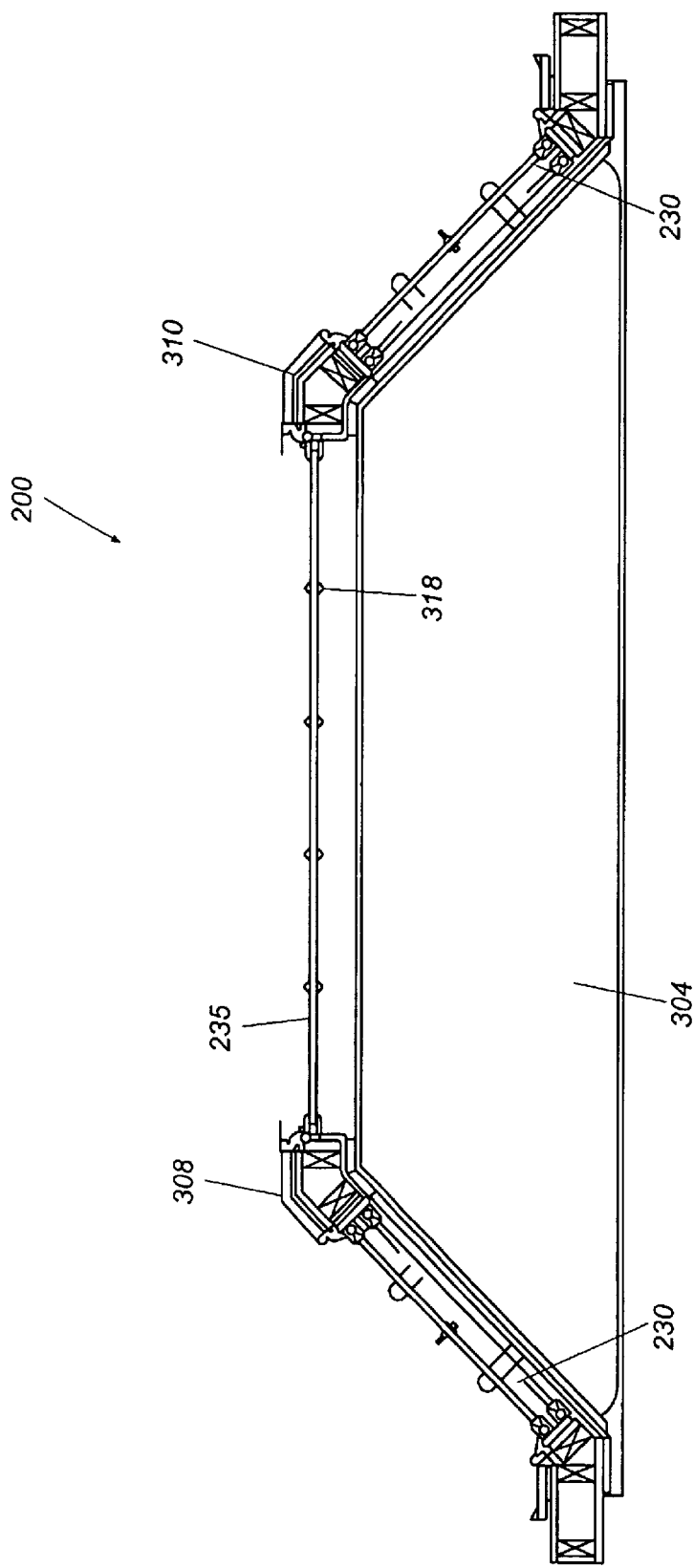
FIG. 3 is a cross-sectional view of the bay window unit of FIG. 2 taken along line 3—3 in FIG. 2.

FIGS. 2 and 3 show front and cross-sectional views of the bay window unit 200, with a slightly modified cabinet 297 underneath the unit. The bay window unit 200 includes angle mull posts 308, 310 that join the main display window 235 with the two side window units 230. Each of the windows include horizontal grill members 314 and vertical grill members 318. As will be discussed further herein, the grill members 314 may be used to hide acoustical exciters 320, also called speaker elements, attached to the glazing units of the side window units 230 that cause the glass to act as a speaker. In FIG. 3, the exciters 320 are positioned behind the horizontal grill members 314, between the two glass panes of the side window units 230, causing the glass pane to which they are attached to act as a speaker. The exciter could be located on one of two panes of glass of an insulated glass unit, or the exciter could be located on a third pane of glass used within an insulated glass unit. The exciter may also be located on a single pane of glass.

Figure 4:
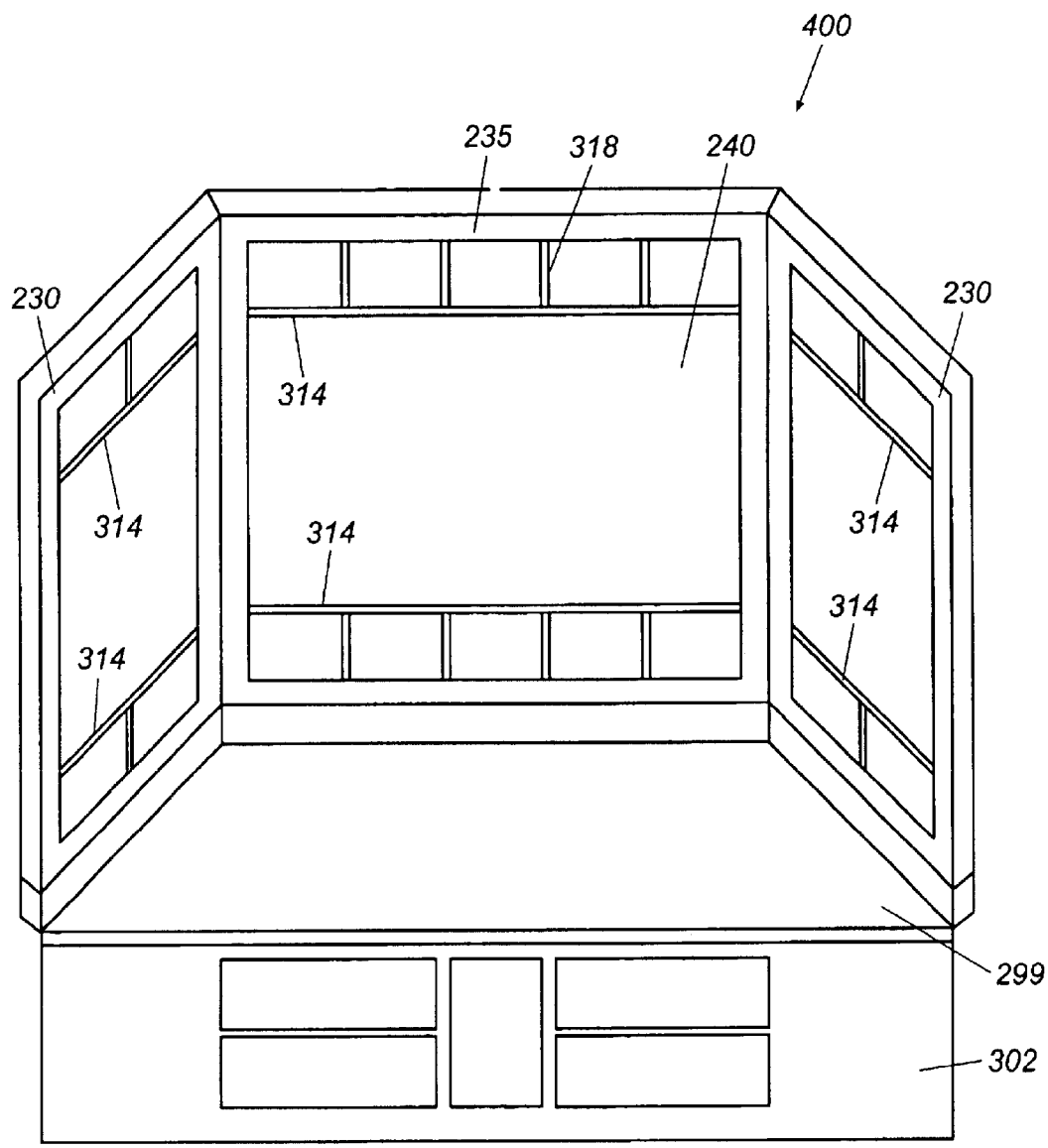
FIG. 4 is a perspective view of an alternative media window system.

The horizontal and vertical grill elements 314, 318 may be used to attractively frame the display area 240, which may be smaller than the overall glass unit 212. An alternative configuration of grill elements is shown in FIG. 4, a perspective view of an alternative bay window unit 400. Elements of the bay window unit 400 that are similar to the bay window unit 200 will be referred to using identical reference numbers. The bay window unit 400 includes a main window 235 and two side windows 230. A seat board 299 and a headboard (not shown) are also included in the bay window unit. A cabinet area 302 is located below the seat board 299. Horizontal grill elements 314 are provided both above and below the display image surface 240. Vertical grill elements 318 are also provided.

Figure 5:
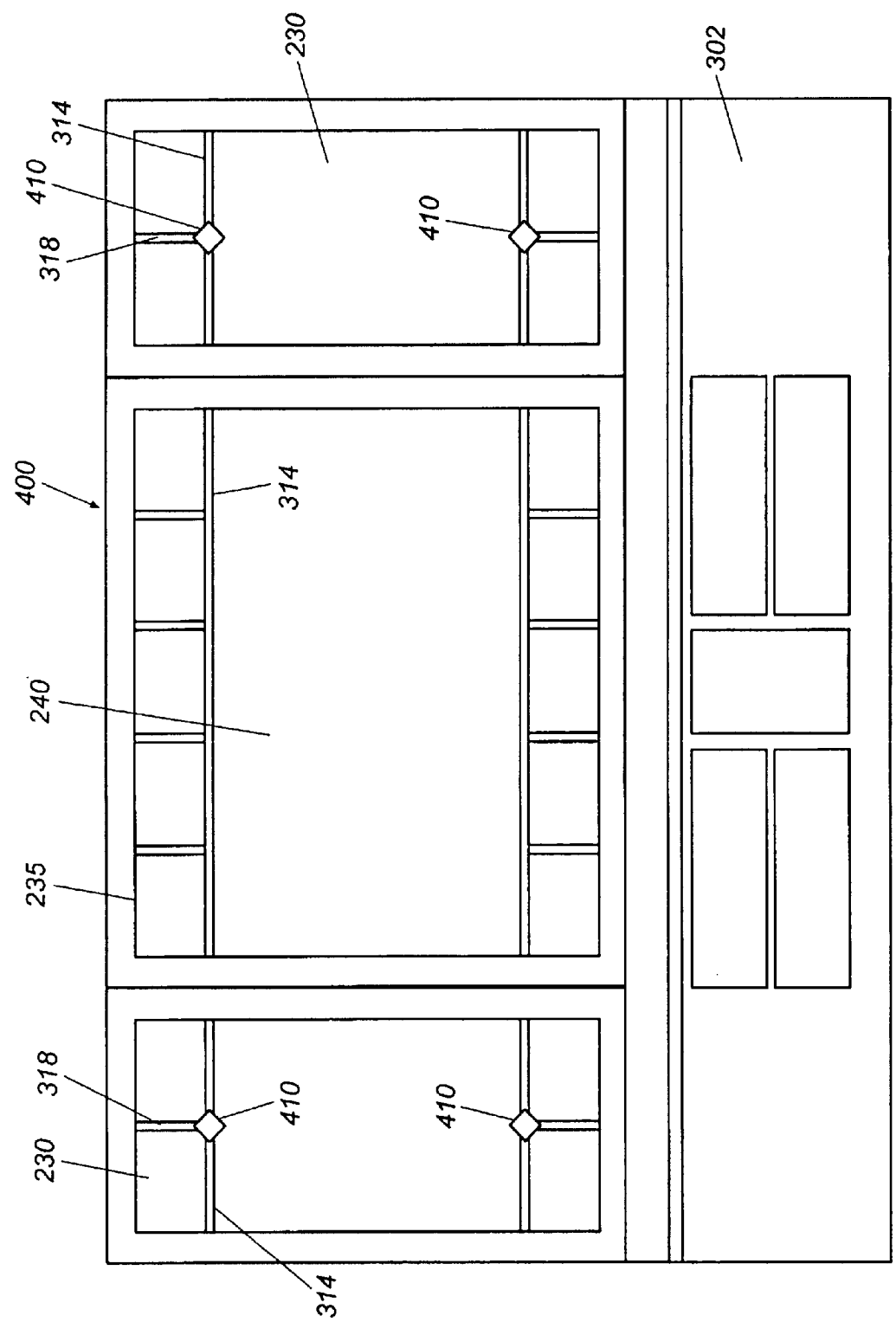
FIG. 5 is a front view of the components of the media window system of FIG. 4.

FIG. 5 shows a front view of the window components of the bay window unit 400 of FIG. 4, with the side window units 230 shown in a frontal view, rather than at an angle, as they would be in an installed configuration. FIG. 5 also illustrates diamond shaped elements 410 at the intersection of the horizontal grill elements 314 and vertical grill elements 318 on the side windows 230. Behind the diamond shaped elements 410, an exciter may be located that causes the glass to act as a speaker to provide sound to accompany the display image source. The exciter may be located in between two panes of glass that are included in each of the side windows 230, with wiring for the exciters positioned behind the horizontal or vertical grill elements to conceal it.

Figure 6:
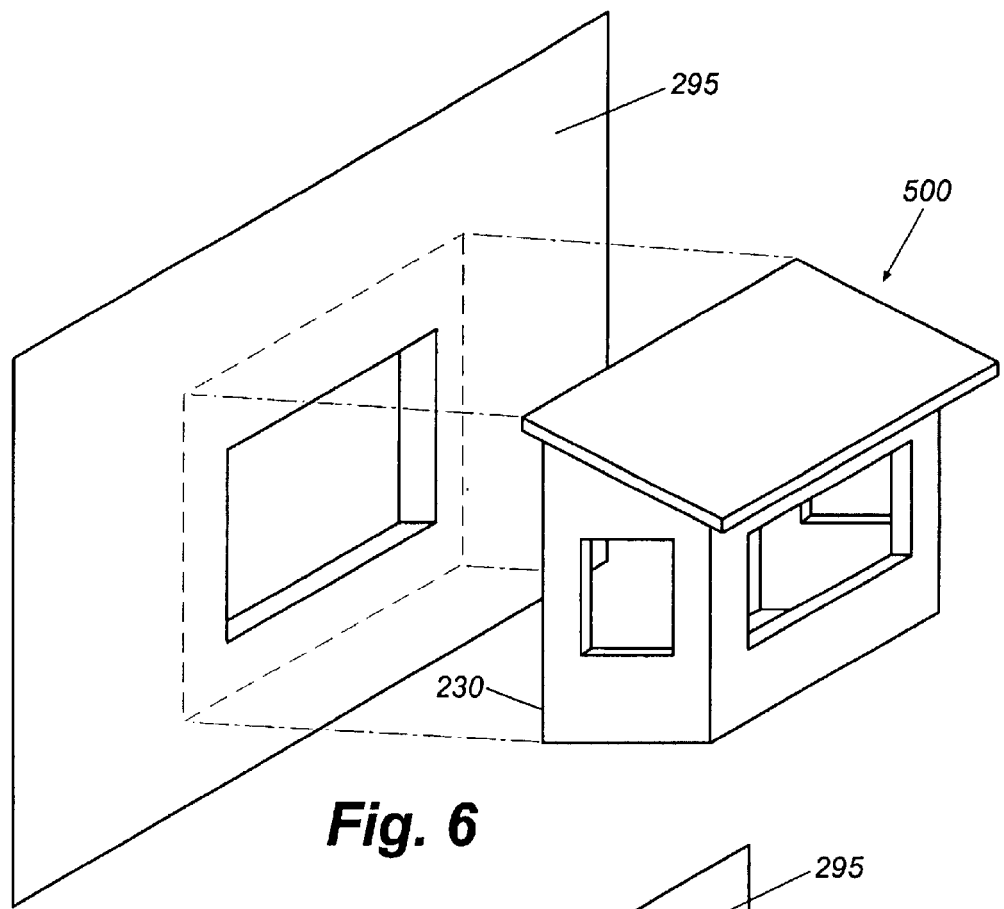
FIG. 6 is an exploded view of a window unit configured for attachment to an exterior wall.
Figure 7:
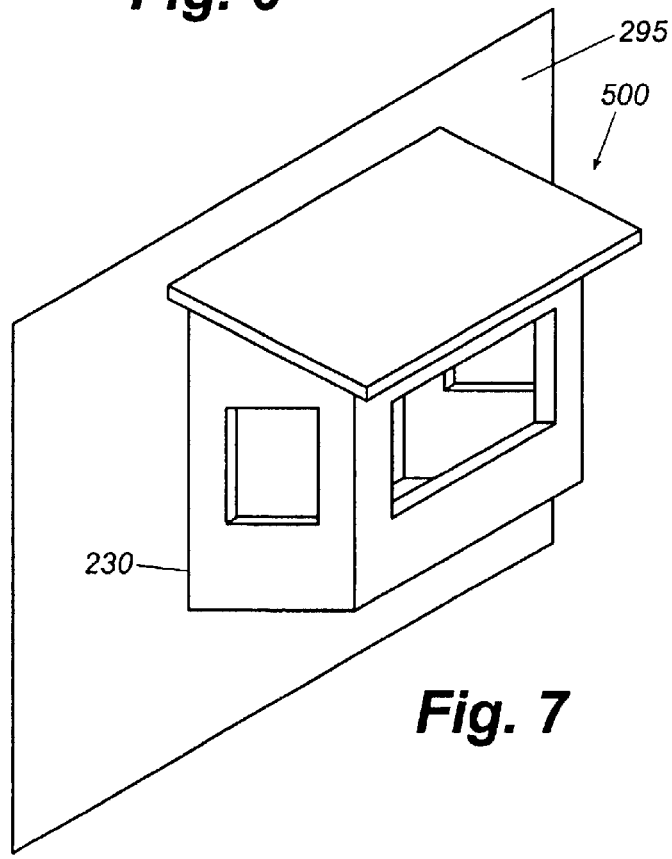
FIG. 7 is a perspective view of the window unit attached to an exterior wall.
Figure 8:
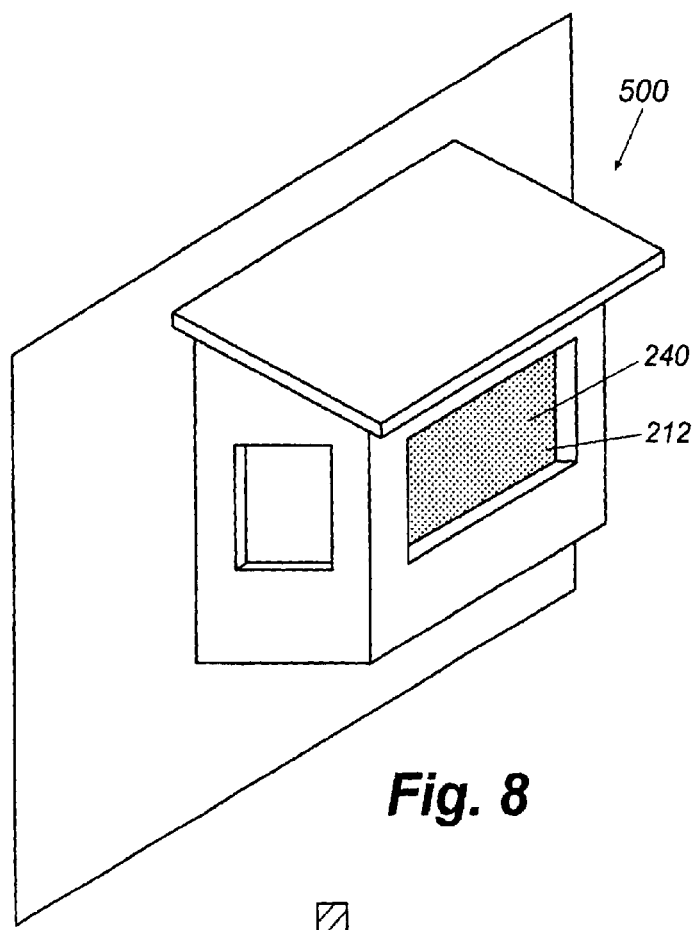
FIG. 8 is a perspective view of the window unit attached to an exterior wall in a state of increased opacity.

A bay window unit 500 is shown positioned on the exterior wall 295 of a structure shown in FIGS. 6–7. In FIG. 8, the display surface 240 of the window unit 500 is shown in an opaque state for viewing images. In this embodiment, the display area 240 is the entire visible area of the main glass unit 212.

Figure 9:
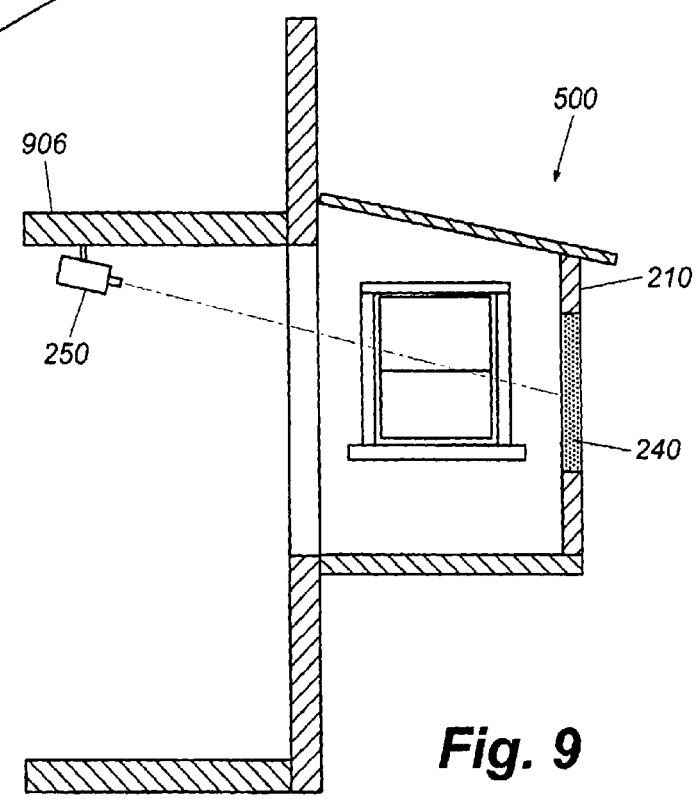
FIG. 9 is a side cross-sectional view of a media window system where a display image source is fastened to the ceiling of a structure.
Figure 10:
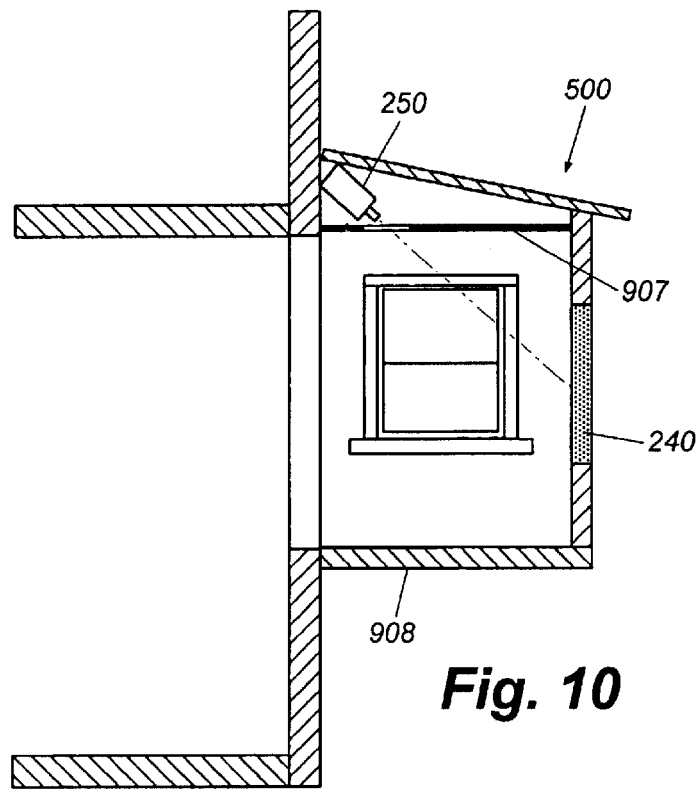
FIG. 10 is a side cross-sectional view of a media window system where a display image source is fastened to a headboard of a bay window.
Figure 11:
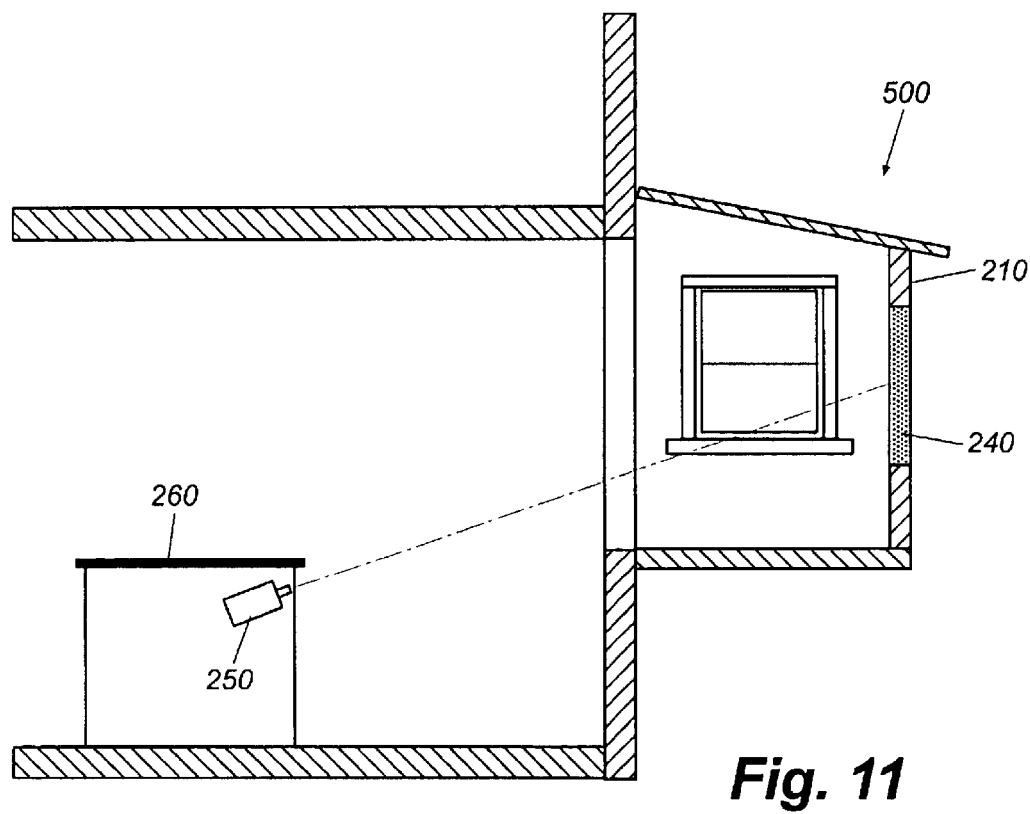
FIG. 11 is a side cross-sectional view of a media window system where a display image source is positioned in an object spaced from the window unit.

Within a media window system, there are many different possibilities for locating the display image source. FIGS. 9–11 show three alternative positions for display image source 250. As shown in FIG. 9, the image source 250 may be located on a ceiling 906 of a structure to which the bay window unit 500 is attached. The display image source 250 may be located at many different distances from the bay window unit 500, where the image source would be adjusted to provide the desired image on the display surface 240. FIG. 10 shows the display image source 250 located on a headboard 907 of the bay window unit 500. Alternatively, the display image source 250 may be located within an object 260 that is spaced from the bay window unit 500, for example, a coffee table, providing a longer optical path for the display images. In an alternative embodiment, the projector could be located in an object positioned directly below the window unit, not spaced from it in the room. Another alternative is locating the projector within the window frame of the window unit. Because the projector is relatively close to the display area in this position, keystoning of the image and other technical issues may need to be addressed by the display image source.

Figure 12:
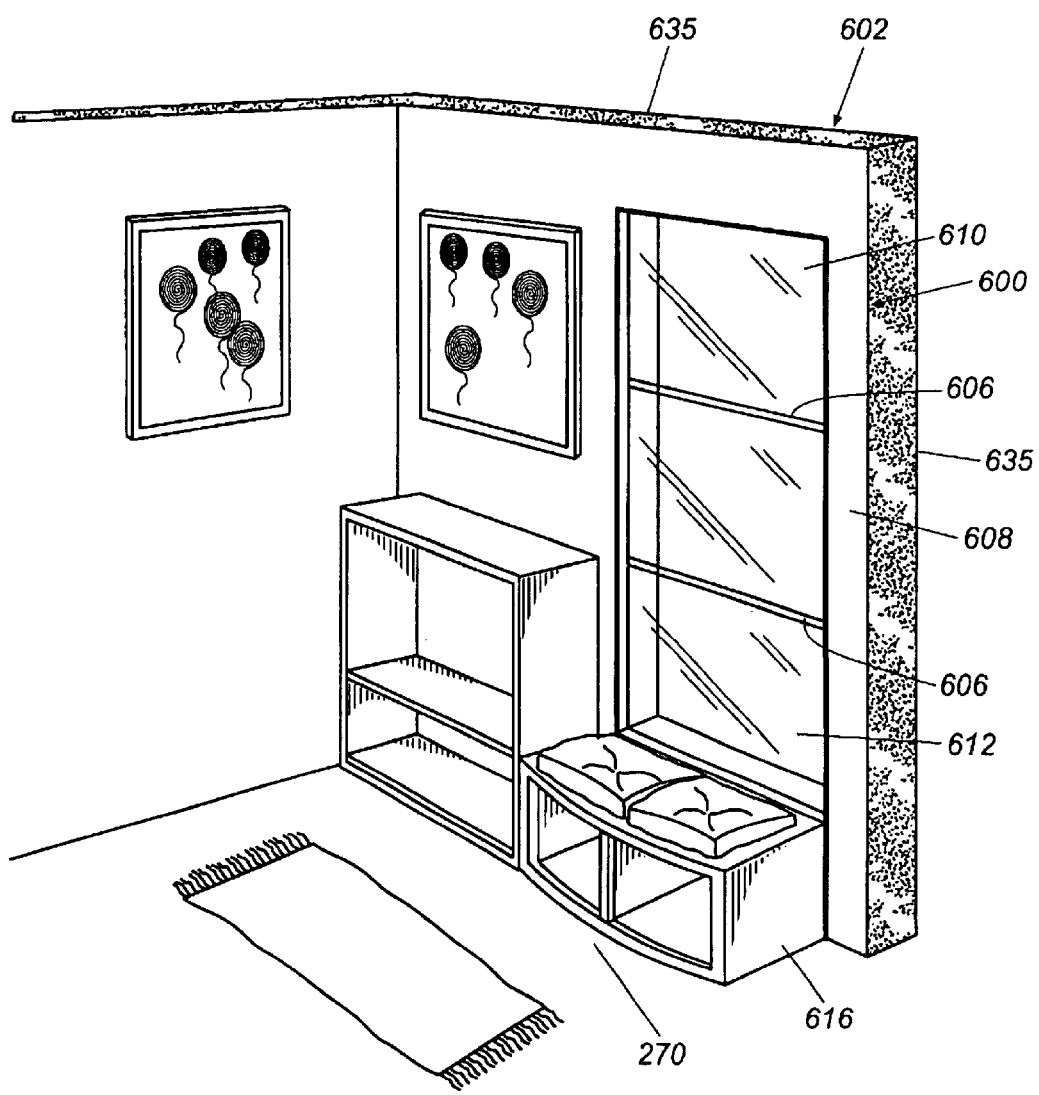
FIG. 12 is a perspective view of a media window system used with an interior window unit of the present invention.

Instead of a bay window unit, a simple rectangular window unit 600 may be used with the media window system of the present invention, as shown in FIG. 12. The window unit 600 may be located in either an exterior wall or an interior wall. FIG. 12 illustrates the window unit 600 in an interior wall 602, such as a wall that would separate two rooms within a house. Although many alternatives are possible for the configuration of the window unit 600, in one embodiment the window unit has three separate vertical sections defined by two horizontal grill members 606. Preferably, at least the middle window section 608 is capable of transforming between a transparent state and an increased opacity state so that images may be viewed on the middle window section 608. Alternatively, the top window section 610 or the bottom window section 612 or both may also be capable of transforming to an increased opacity state. A bench 616 or other object may be provided below the window unit 600 and may conceal a display image source, such as a projector.

Where the media window system of FIG. 12 is used in an interior wall, speakers 635 may be positioned on either side of the window unit 600 in an interior wall 602. In one embodiment, a second pair of speakers may be located on the opposite side of the interior wall 602. Alternatively, other speaker locations mentioned herein may be used.

Figure 13:
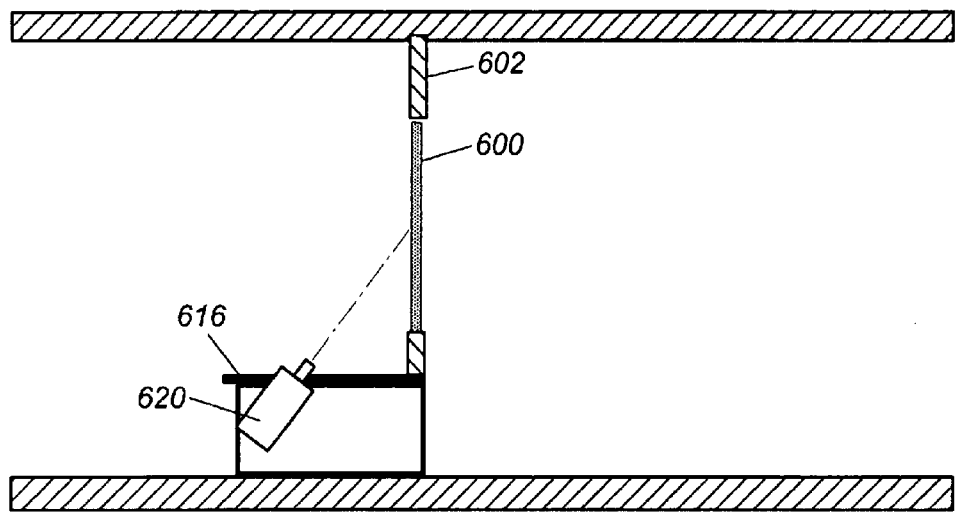
FIG. 13 is a side cross-sectional view of a media window system using an interior window where a display image source is positioned in an object near the window.
Figure 14:
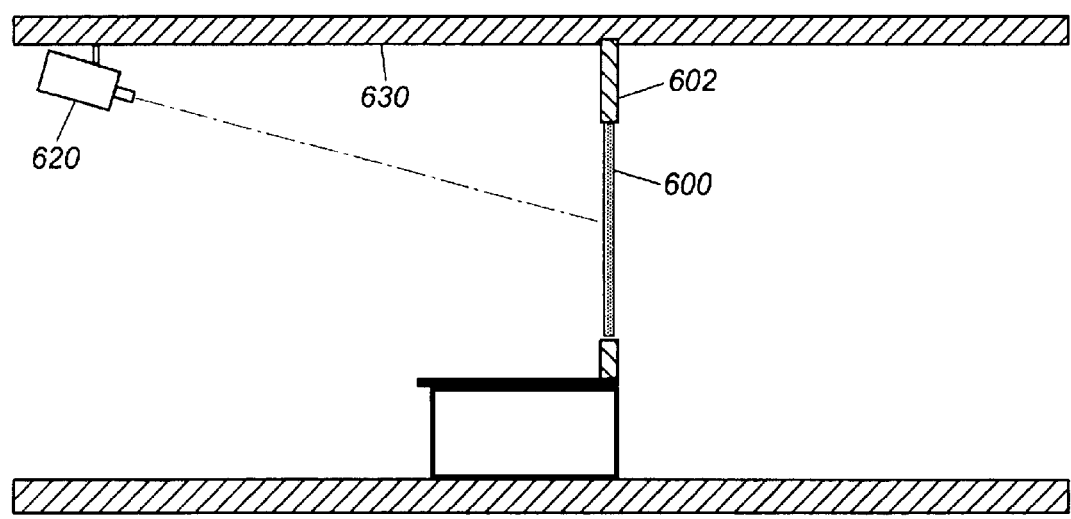
FIG. 14 is a side cross-sectional view of a media window system using an interior window where a display image source is positioned on a ceiling near the window.
Figure 15:
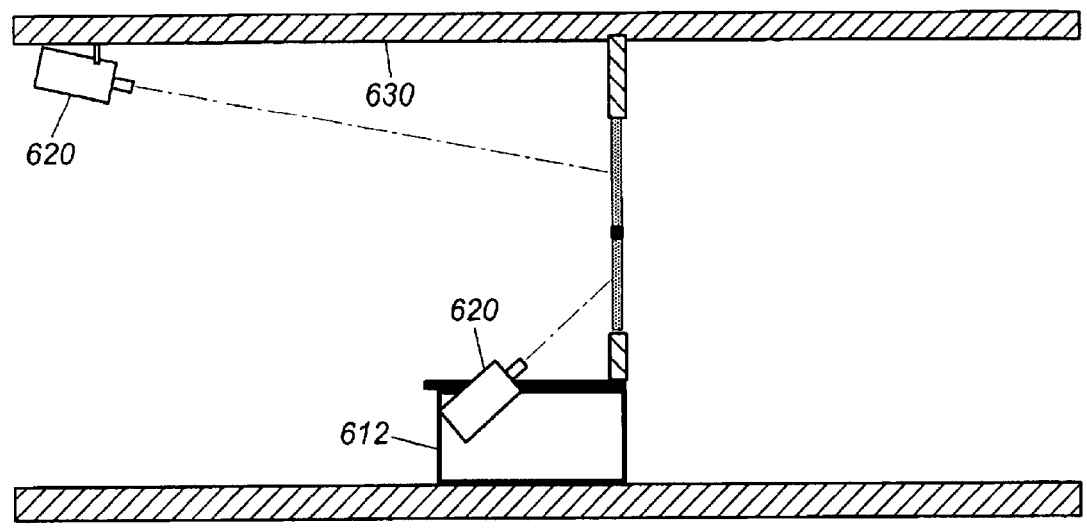
FIG. 15 is a side cross-sectional view of a media window system using an interior window where two display image sources are included.

FIG. 13 illustrates a display image source 620 positioned within a bench 616 to project images onto a window unit 600. Alternative projector positions include a projector on a ceiling 630, as shown in FIG. 14. Yet another possibility would be to position two display image sources 620 at two different locations, such as within a object or bench 616 and on a ceiling 630, as shown in FIG. 15. The two display image sources 620 could project images onto two different portions of the window unit 600.

Normally, when a viewer is located on the opposite site of a window unit 600 from the display image source 620, the viewer will see the display images in reverse, if the increased opacity state is somewhat transparent to allow this view. This feature may be useful if a parent in one room would like to monitor the viewing of children in an adjacent room, for example. Alternatively, the display image source could be programmed to allow reverse the projection of the images, so that viewers in the room opposite from the display image source could also view the images in their intended orientation. The users could then choose from which side of the window unit they wanted to watch the display.

The window unit can be constructed by providing a window frame defining a frame perimeter and providing a window within the frame perimeter. The window includes a display area adapted to receive a display image. A display image source can be disposed in a variety of locations including on the window frame and in an object on the floor near the window frame. A speaker element can be disposed on the window, or behind the viewer or listener. In another embodiment, the audio or speaker element can be used separately. The display surface can transform from a first transparent state to a second increased opacity state for receiving the display image on the display surface.

Figure 16:
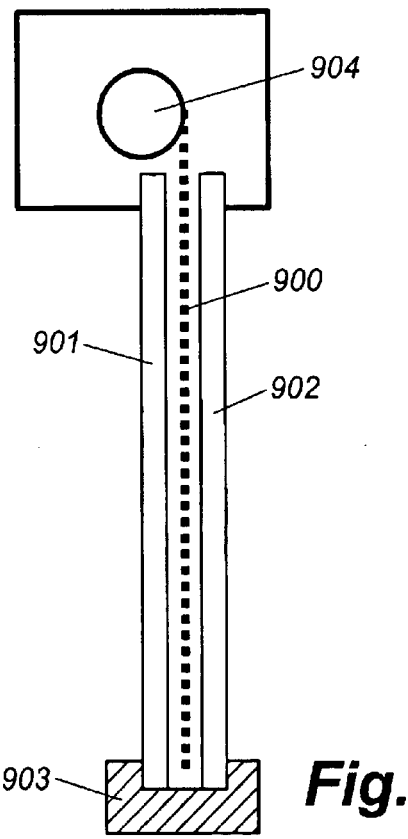
FIG. 16 is a side cross-sectional view of a window unit including a movable screen as the display surface.

An alternative means of changing the opacity of a window unit to provide a display surface is generally shown in FIG. 16. Screen 900 is disposed between a first pane 901 and second pane 902. Screen 900 may be comprised of any material capable of receiving an image from a projector, such as typical projector screen materials.

The first and second panes may or may not be joined in a sealed manner to form an insulated glass pane around the screen. A screen may alternatively be provided between an exterior surface of an insulated glass pane and a third pane of glass.

In one embodiment, screen 900 can be rolled onto the exterior surface of drum 904. Drum 904 rotates to move screen 900 toward stop 903, thereby providing an alternative display surface. Drum 904 is preferably at least as long as the width of screen 900. This enables screen 900 to roll onto drum 904 in a smooth and even manner while helping to protect screen 900 from unnecessary deformation. Unnecessary deformation could cause damage to screen 900 and impair its effectiveness as display surface 140. Drum 904 also comprises a diameter suitable for allowing screen 900 to be disposed about drum 904 without causing permanent deformation to screen 900. If the diameter of drum 904 is very small, creases may develop. The diameter of drum 904 is typically greater than 0.25", preferably greater than 0.5", and more preferably greater than 1.0".

Drum 904 may be comprised of a variety of materials including wood, plastic, metal or fiberglass. In any case, drum 904 is typically strong enough to support the added weight of screen 900. Drum 904 may be rotated using a variety of means. For example, a user may rotate drum 904 with a handle or cord. In other embodiments, a motor, like an electric motor, may be employed. In the case of the electric motor, care must be taken to avoid having the screen 900 come into contact with contaminants from the motor.

Figure 17:
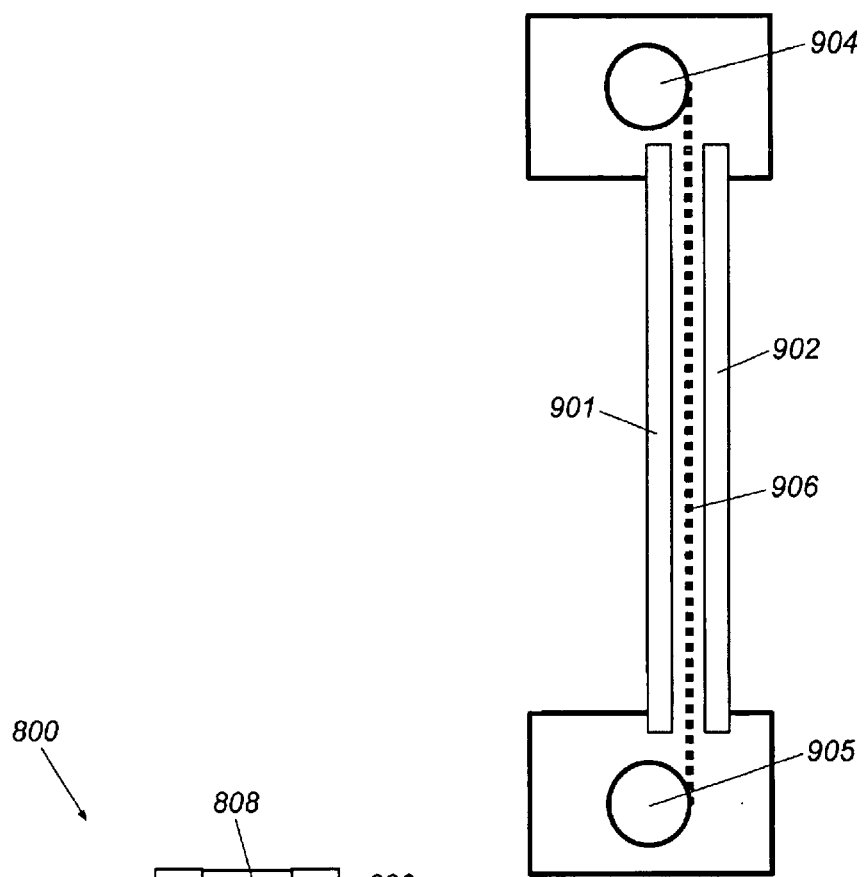
FIG. 17 is a side cross-sectional view of another window unit including a movable screen as the display surface.

FIG. 17 illustrates an alternative means for moving an alternative screen 906. Screen 906 is disposed about drum 904 and drum 905. Screen 906 may include a portion with an opening or transparent section that is moved into place within the panes when a transparent state is desired.

With reference to FIG. 2, the window unit 200 may also include an exciter 320 that causes the glass to act as a speaker. The exciter 320 may be disposed in one or more of the windows 230, 235. The exciter 320 can produce sound in response to an audio signal. The audio signal may be an analog signal, a digital signal or an analog and digital signal, and the like. The exciter 320 can be located on or in the window 230. Alternatively, the exciter 320 can be located between panes of glass in the window 230. The exciter 320 may operate in cooperation with the display image source 250 to provide sound for the display images. In alternative embodiments, an exciter may be located on the edge or corner of the glass within the window frames 211 or 213. Alternatively, a simple speaker may be incorporated into one or more of the window frames 211 or 213, or in the wall adjacent to the window unit 200. The term speaker element will be used herein to either refer to a complete conventional speaker including a substrate or to an exciter that causes a glass pane to act as a speaker.

Figure 18:
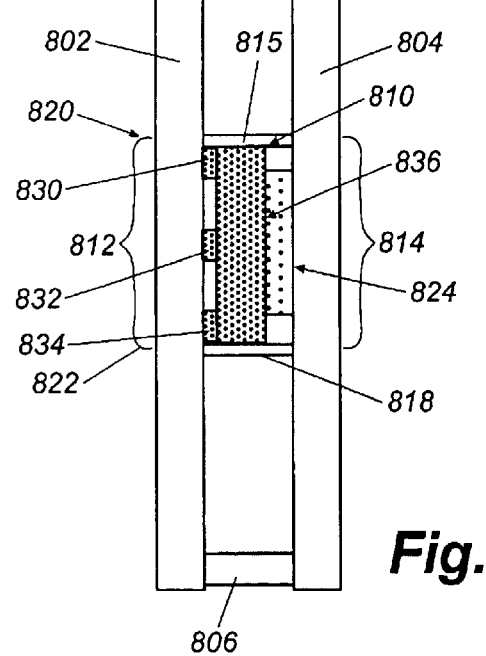
FIG. 18 is a side cross-sectional view of a speaker element within a double-paned window.

FIG. 18 shows a side cross sectional view of a double-glazed window 800 incorporating a sound generator. Windowpane 802 and windowpane 804 are separated by spacer elements 806 and 808 fitted on all sides of windowpanes 802 and 804. Windowpane 802 and windowpane 804 are preferably comprised of glass, although plastic windowpanes can be used in alternative embodiments. The windowpanes 802 and 804 are generally connected to the spacer elements 806 and 808 by the adhesive nature of the spacer elements themselves or by a coat of adhesive. One type of spacer element is available from Edgetech of Cambridge, Ohio under the tradename Super Spacer®.

Exciter 810 is positioned between a first grill 812 and second grill 814. First grill 812 is generally disposed on windowpane 802 and second grill 814 is generally disposed on windowpane 804. Internal dividers 816 and 818 can be disposed between windowpanes 802 and 804 at the top and bottom of the exciter 810 to generally conceal a view of exciter 810. Alternatively, the window unit 800 may not include any internal dividers. It is generally desirable for the distance between dividers 816 and 818 to be the same as the distance between the top 820 of first grill 812 and bottom 822 of first grill, as illustrated, so that the exciter is concealed behind the grill elements 812 and 814.

The width and height of windowpanes 802 and 804 shall preferably be greater than 10 inches (25.4 centimeters), more preferably 20 inches (50.8 centimeters). As the dimensions are greater, the double-glazed window 800 will be increasingly capable of producing low tones. An exciter 810 is disposed between windowpane 802 and windowpane 804. Exciter 810 is adhered to windowpane 802 to cause windowpane 802 to vibrate with respect to windowpane 804. The exciter 810 can be supplied with varying voltage by means of a wire.

In a preferred embodiment, the wire is led between the windowpanes 802 and 804 between internal divider 816 and 818. Next, the wire can go through a spacer to be connected to an electric signal generator, which will cause windowpane 802 to vibrate and act as a speaker.

In one embodiment, cushion 824 is disposed between exciter 810 and windowpane 804 to prevent the exciter 810 from rattling against the windowpane 804. This configuration provides a certain amount of damping to windowpane 804 relative to windowpane 802. In some embodiments, several exciters 810 can be provided to increase the vibration of either one or both of windowpanes 802 and 804. For example, FIG. 2 illustrates two exciters 300 positioned on each of two side windows 230 behind a grill element 314. Horizontally, the exciters 300 are approximately spaced at one-third points across the width of the side windows 230. Vertically, the exciters are about 16 inches (41 centimeters) from the top edge of the glass unit, where the entire glass unit has a height of about 48 inches (122 centimeters). FIG. 3 illustrates two exciters positioned on each of two side windows 230 behind diamond-shaped decorative elements 410. Vertically, each exciter is about 8 inches (20 centimeters) from the top or bottom of the glass unit which has a total height of about 48 inches (122 centimeters). Horizontally, each exciter is centered.

Examples of acoustic devices suitable for use in the present invention are disclosed in U.S. Pat. Nos. 6,427,016 and 6,496,586, entitled ACOUSTIC DEVICES and THIN LOUDSPEAKER respectively, the disclosures of which are incorporated by reference herein. An exciter that can be used with the present invention is available from NXT plc of London.

When manufacturing window 800, it is generally desirable to clean the surfaces 828 and 826 of windowpanes 802 and 804, especially where exciter 810 will be positioned. An acrylic bead/organic acid mixture is often present on the glass to protect it during shipping and can be removed with a glass cleaner. Next, the area of windowpane 802 or 804 adjacent to where exciter 810 will be positioned is marked and masked. A material such as masking tape is generally useful for masking the surfaces of windowpanes 802 and 804.

Once the surface 828 and 826 of windowpanes 802 and 804 is masked, the glass surfaces where exciter 810 will be positioned are abraded. Sandpaper comprising approximately 150 grit is generally useful for abrading the surface of the windowpanes 802 and 804. The masking tape protects the portions of the glass, which are not abraded. The process of abrading the surface of glass can create sanding debris, which should generally be removed. Once the sanding debris is removed, the surface of windowpanes 802 and 804 may be cleaned again. Next, an epoxy can be applied to the surface 830, 832, and 834 of the exciter 810 that will contact windowpane 802. Instead of an epoxy, cyanoacrylate may be used to adhere the exciter to glass surface, in which case the masking and abrading steps can be skipped. Next, the side 830, 832, and 834 of exciter 810 containing epoxy or cyanoacrylate is placed on the surface of windowpane 802 until the substance sets. Cushion 824 is then placed on surface 836 of exciter 810. Windowpane 804 may then be positioned against the spacers 806 and 808 and secured in place on a coat of adhesive or by the adhesive nature of the spacers.

Alternatively, embodiments similar to the embodiments shown in FIGS. 1–16 may be constructed using a door unit. A door unit may include one or two doors. The doors may open by sliding or rotating the door about a hinge. A door unit may also include a stationary component including a glazing unit. One or more of the glazing units in the door may be capable of switching from a transparent state to an increased opacity state. A display image source may be provided in the door frame, the door unit frame or otherwise proximate to the door unit to project an image onto some portion of a glazing unit or units. For example, a door unit may include two doors and the display image source may project on only the glazing unit or window of only one door. Alternatively, the display image may project one image on the glazing units of both doors, or may project two different images onto the glazing units of the two doors. In addition, one, two, or more speaker elements may be disposed on one or more of the windows or glazing units of the door unit.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A media window system comprising:
   (a) a window unit including window frame defining a frame perimeter and a glass unit located within the frame perimeter, the glass unit including a display area adapted to receive a display image, wherein the display area of the glass unit can transform from a first transparent state to a second increased opacity state;
   (b) a display image source configured and arranged to direct a display image onto the display area; and
   (c) a speaker element in the window unit.

2. The media window system of claim 1, wherein the window unit is an interior window located within the interior of a building comprising a floor, a ceiling, and at least one wall.

3. The media window system of claim 2, wherein the display image source is fastened to the ceiling of the structure.

4. The media window system of claim 2, wherein the display image source is fastened to the wall of the structure.

5. The media window system of claim 2, wherein the display image source rests on the floor of the structure.

6. The media window system of claim 2, wherein the display image source is disposed within an object resting on the floor of the structure.

7. The media window system of claim 1, wherein the window unit is located in an exterior wall of a structure separating an interior environment from an exterior environment.

8. The media window system of claim 7, wherein the window unit is a picture window.

9. The media window system of claim 7, wherein the display image source is located in the interior environment.

10. The media window system of claim 7, wherein the window unit is a bay window including a main display window between two side windows, where the main display window includes the display area.

11. The media window system of claim 10, wherein the main display window includes an interior pane and an exterior pane, wherein the speaker element is disposed on the interior pane of the main display window.

12. The media window system of claim 10, wherein each of the side windows includes an interior pane and an exterior pane, wherein the speaker element is disposed on the interior pane of one of the two side windows and a second speaker element is disposed on the other of the two side windows.

13. The media window system of claim 10, wherein the display image source is fastened to a headboard of the bay window.

14. The media window system of claim 1, wherein the window unit is located in a wall, wherein the display image source is fastened to a ceiling adjacent to the wall.

15. The media window system of claim 1, wherein the window unit is located in a wall, wherein the display image source rests on a floor adjacent to the wall.

16. The media window system of claim 1, wherein the window unit is located in a wall, wherein the display image source is disposed within an object resting on a floor adjacent to the wall.

17. The media window system of claim 1 wherein the window unit separates a first space from a second space and the display image source is located in the first space, wherein the display area is configured and arranged so that the display image can be viewed from the first space in a first orientation and the display image can be viewed in a reversed orientation from the second space.

18. The media window system of claim 17 wherein the display image source is configured and arranged so that the display image can be viewed from the second space in the first orientation.

19. The media window system of claim 17 wherein the display image source is a projector.

20. The media window system of claim 1, wherein the glass unit includes a first pane and a second pane, wherein the display area includes an opaque screen disposed between the first pane and second pane, wherein the screen is configured to move relative to the frame.

21. The media window system of claim 1 wherein electrical current within the glass unit causes the glass unit to transform from a first transparent state to a second increased opacity state for receiving the display image on the display area.

22. The media window system of claim 21 wherein the glass unit comprises a polymer dispersed liquid crystals positioned between pieces of conducting glass.

23. The media window system of claim 1 wherein the window unit is located within a door.

24. The media window system of claim 1, wherein the speaker element is disposed in the window frame.

25. The media window system of claim 1, wherein the speaker element is an exciter disposed on the glass unit.

26. The media window system of claim 25 wherein the glass unit comprises a first pane and a second pane, wherein the exciter is disposed between the first pane and the second pane.

27. The media window system of claim 25, wherein the glass unit is fixed within the frame perimeter.

28. The media window system of claim 25 wherein the window unit further comprises a first grill element positioned on the glass unit, wherein the exciter is attached to the glass unit and positioned at least partially behind the first grill element.

29. The media window system of claim 28, further comprising a dampener, wherein the dampener is located between the exciter and the second pane and the exciter is adhered to the first pane.

30. The media window system of claim 28, further comprising a wire for delivering electronic signals to the exciter wherein the wire is positioned behind the first grill element.

31. The media window system of claim 28, further comprising a second grill element intersecting the first grill element, wherein the exciter is positioned at least partially behind the intersection of the first and second grill elements.

32. The media window system of claim 31 further comprising a decorative element positioned at the intersection of the first and second grill elements, wherein the exciter is positioned behind the decorative element.

33. The window unit of claim 32 wherein the decorative element is diamond-shaped.

34. The window unit of claim 33 wherein the decorative element is circular.

35. The window unit of claim 33 wherein an outer diameter of the exciter is less than or equal to a width of the grill element.

36. A method comprising:
(a) providing a window unit including a window frame defining a frame perimeter and a glass unit within the frame perimeter, the glass unit including a display area adapted to receive a display image, wherein the glass unit can transform from a first transparent state to a second increased opacity state;
(b) disposing a display image source in a position to project an image onto the display area; and
(c) disposing a speaker element on the window unit.

37. A media window system comprising:
(a) a window unit including window frame defining a frame perimeter and a glass unit located within the frame perimeter, the glass unit including a display area adapted to receive a display image, wherein the display area of the glass unit can transform from a first transparent state to a second increased opacity state, wherein the window unit is installed in an interior wall of a structure;
(b) a display image source configured and arranged to direct a display image onto the display area; and
(c) a speaker in the interior wall near the window unit.

38. The media window system of claim 37, wherein the display image source is fastened to a ceiling of the structure.

39. The media window system of claim 37, wherein the display image source rests on a floor of the structure.

40. The media window system of claim 37, wherein the display image source is disposed within an object resting on a floor of the structure.

41. The media window system of claim 37 wherein the display image source is a projector.

42. The media window system of claim 37 wherein electrical current within the glass unit causes the glass unit to transform from a first transparent state to a second increased opacity state for receiving the display image on the display area.

43. The media window system of claim 42 wherein the glass unit comprises a polymer dispersed liquid crystals positioned between pieces of conducting glass.

44. A window unit comprising:
   (a) a window frame defining a frame perimeter;
   (b) a glass unit located within the frame perimeter; and
   (c) a first grill element positioned on the glass unit;
   (d) an acoustical exciter attached to the glass unit and positioned at least partially behind the first grill element;
wherein the glass unit is configured to project sound waves by vibrating in response to signals from the acoustical exciter.

45. The window unit of claim 44, wherein the glass unit located within the frame perimeter comprises a first pane and a second pane, wherein the acoustical exciter is disposed between the first pane and the second pane.

46. The window unit of claim 45, further comprising a dampener, wherein the dampener is located between the acoustical exciter and the second pane and the speaker is adhered to the first pane.

47. The window unit of claim 44, further comprising a wire for delivering electronic signals to the acoustical exciter wherein the wire is positioned behind the first grill element.

48. The window unit of claim 44, wherein the glass unit is fixed within the frame perimeter.

49. The window unit of claim 44, further comprising a second grill element intersecting the first grill element, wherein the acoustical exciter is positioned at least partially behind the intersection of the first and second grill elements.

50. The window unit of claim 49 further comprising a decorative element positioned at the intersection of the first and second grill elements, wherein the exciter is positioned behind the decorative element.

51. The window unit of claim 50 wherein the decorative element is diamond-shaped.

52. The window unit of claim 50 wherein the decorative element is circular.

53. The window unit of claim 44 wherein an outer diameter of the exciter is less than or equal to a width of the grill element.

54. A window unit comprising:
   (a) a window frame defining a frame perimeter;
   (b) a glass unit located within the frame perimeter comprising a first pane and a second pane; and
   (c) an acoustical exciter attached to the glass unit and positioned between the first and second panes;
wherein the glass unit is configured to project sound waves by vibrating in response to signals from the exciter.

* * * * *